United States Patent

Käuffert et al.

Patent Number: 5,831,598
Date of Patent: Nov. 3, 1998

[54] METHOD OF FACILITATING THE OPERATION OF TERMINALS INTELECOMMUNICATIONS SYSTEMS

[75] Inventors: Uwe Käuffert, Pforzheim; Wilfried Lücke, Ludwigsburg, both of Germany

[73] Assignee: Alcatel N.V., Amsterdam, Netherlands

[21] Appl. No.: 759,447

[22] Filed: Dec. 5, 1996

Related U.S. Application Data

[63] Continuation of Ser. No. 340,490, Nov. 15, 1994, abandoned, which is a continuation of Ser. No. 1,198, Jan. 7, 1993, abandoned.

[30] Foreign Application Priority Data

Jan. 25, 1992 [DE] Germany ............................ 42 02 041.7
Jan. 25, 1992 [DE] Germany ............................ 42 02 040.9

[51] Int. Cl.$^6$ ...................................................... G09G 5/00
[52] U.S. Cl. ............................................. 345/168; 345/172
[58] Field of Search .................................... 345/156, 173, 345/168, 169, 172; 341/20, 21, 22, 23; 364/709.01, 709.14, 709.11, 709.15

[56] References Cited

U.S. PATENT DOCUMENTS

| | | | |
|---|---|---|---|
| 4,202,038 | 5/1980 | Petersson | 341/24 |
| 4,333,097 | 6/1982 | Buric et al. | 345/168 |
| 4,823,311 | 4/1989 | Hunter et al. | 345/172 |
| 5,111,426 | 5/1992 | Bergstresser | 364/DIG. 2 |
| 5,181,029 | 1/1993 | Kim | 345/172 |
| 5,258,748 | 11/1993 | Jones | 345/172 |
| 5,287,119 | 2/1994 | Drumm | 345/157 |
| 5,388,251 | 2/1995 | Makino et al. | 395/155 |

FOREIGN PATENT DOCUMENTS

| | | |
|---|---|---|
| 0 120 476 | 10/1984 | European Pat. Off. . |
| 0 120 477 | 10/1984 | European Pat. Off. . |
| 0 173 264 | 3/1986 | European Pat. Off. . |
| 0 279 233 | 8/1988 | European Pat. Off. . |
| 0 419 948 | 4/1991 | European Pat. Off. . |
| 31 39 501 | 9/1981 | Germany . |
| 33 11 032 | 10/1984 | Germany . |
| 33 29 768 | 3/1985 | Germany . |
| 34 10 608 | 9/1985 | Germany . |
| 40 17 895 | 6/1990 | Germany . |
| 40 17 897 | 6/1990 | Germany . |
| 41 07 745 | 3/1991 | Germany . |
| 40 08 598 | 9/1991 | Germany . |
| 91 10 348 | 1/1992 | Germany . |
| 2196559 | 8/1990 | Japan . |

*Primary Examiner*—Chanh Nguyen
*Attorney, Agent, or Firm*—Spencer & Frank

[57] ABSTRACT

Operation of a terminal equipped with an input keyboard whose function keys can be given fixed and/or variable function assignments and having a display unit on which a text explaining the function of the function keys can be displayed, is facilitated. Execution of a respective function, as well as display of text explaining the respective function, is effected solely by actuation of a respective function key by determining the manner and/or extent of the actuation of the respective function key.

20 Claims, 2 Drawing Sheets

METHOD OF FACILITATING THE OPERATION OF TERMINALS INTELECOMMUNICATIONS SYSTEMS

This application is a continuation of application Ser. No. 08/340,490, filed Nov. 15, 1994 (now abandoned), which was a continuation of application, Ser. No. 08/001,198, filed Jan. 7, 1993 (now abandoned).

CROSS REFERENCE TO RELATED APPLICATION

This application claims the priority of Applications Ser. Nos. P 42 02 040.9 and P 42 02 041.7, both filed Jan. 25th, 1992, in the Federal Republic of Germany, the subject matter of which is incorporated herein by reference.

BACKGROUND OF THE INVENTION

1. Field of the Invention

The present invention relates to a method of facilitating the operation of terminals equipped with function keys.

2. Background Information

In such a method as disclosed in DE 3,329,768.C2 for facilitating the operation of terminals, a certain key is provided within the field of function keys by which the functions to be executed by the function keys are locked before actuation of one of the function keys, a help key, causes a text explaining its function to be displayed on the display unit. Various ways are provided to set and in particular release the lock for the function keys, namely to either depress the respective key once more, or for the respective key to remain depressed, with the lock being released once the key is released, or the lock is released after a certain period of time without further actuation of the respective key if no other function key is actuated.

However, these can represent a relatively complicated sequence of operations which are time consuming. Moreover, it requires the provision of a separate locking key to which no further function can be assigned so that this is counterproductive to the requirement of providing as few keys as possible in order to save space.

Additionally, in the above described method employing the help key, only the performance feature assigned to the respective function key is explained since the marking on the respective function key is generally composed of only more or less clear symbols or abbreviations.

SUMMARY OF THE INVENTION

It is an object of the present invention to provide a method of facilitating the operation of terminals of the above-mentioned type in which fewer keystrokes are required and which results in an optimized operating sequence.

With the aid of the method according to the invention it is possible to operate without locking and unlocking the functions actuatable by means of the function keys. In this way, operation is simpler with fewer keystrokes so that only the function keys are included in the operating sequence.

The manner or extent of the actuation of the respective function key can be realized in different ways.

For an inexperienced user, it may be of advantage, for example, to provide that the user is always first made aware of the respective function before he executes it.

For more experienced users, it is advisable to provide that the user receives a display of the function only if he expressly requests it.

As a feature of this embodiment which is intended for the more experienced user, a display of the function is provided when the function key is pressed for more than an adjustable minimum time, which leads to unambiguity of the desired actuation and to further simplification of operation.

For a user who is very familiar with at least part of the possible functions or performance features it is advisable to provide that the experienced user is made aware of a function to be executed only if his behavior indicates that he is not or only insufficiently familiar with this particular function.

Another simplification of operation results from the cancellation of the display when another function key is actuated or the reset key is actuated.

In order to enable users to operate terminals or to make them aware of the operation of such terminals or make them familiar with them and thus obtain uniform, optimized operation even after user familiarity is improved.

A method which is directed toward the user's experience or his learning success and whose so-called training stages can be selected manually by the operator or also automatically by his behavior, but in any case in dependence on the particular operator.

In this connection it is advisable if it is possible for the user to make a selection from the embodiments for inexperienced users, intermediate users and practiced and experienced users. It is understood that only two stages or more than three such stages may also be provided.

According to a further feature of the invention, it is thus possible to indicate to the user those performance features (and service features, if applicable) which are possible or can be executed, respectively, in the respective current operating state. In other words, the method according to the invention does not serve to explain the symbols or abbreviations of the function keys but to offer the user those performance features that can be executed at the moment. The user thus receives a display of those features from the total quantity of performance features assigned to the terminal which are accessible in the current operating state of the terminal. Depending on the quantity of possible performance features, these features may be displayed in several groups and/or in several individual displays.

The embodiment incorporating further features makes it possible to scroll through the display of the listing of individual possible performance features. This can be done in a clocked manner.

If the possible performance features are displayed in groups, it may be advisable to assign a certain performance feature to the respective function keys also in an optical manner so that the execution of the respective performance feature is realized by the actuation of the respective function key. Particularly if the possible performance features are displayed individually, it is advisable to provide an execute function to one of the function keys.

To terminate the display of the possible performance features if none of the performance features is to be executed, it may be advisable to automatically erase the display without further actuation of a key once a certain period of time has expired. However, this is realized in one embodiment of the present invention to the extent that a reset feature is provided.

According to another embodiment, it is additionally possible to replace the help key by an acoustic input.

BRIEF DESCRIPTION OF THE DRAWINGS

Further details of the invention can be found in the description that follows in which the invention will be described and explained in greater detail with reference to embodiments thereof that are illustrated in the drawings, in which.

DETAILED DESCRIPTION OF THE PREFERRED EMBODIMENTS

Figure 1:
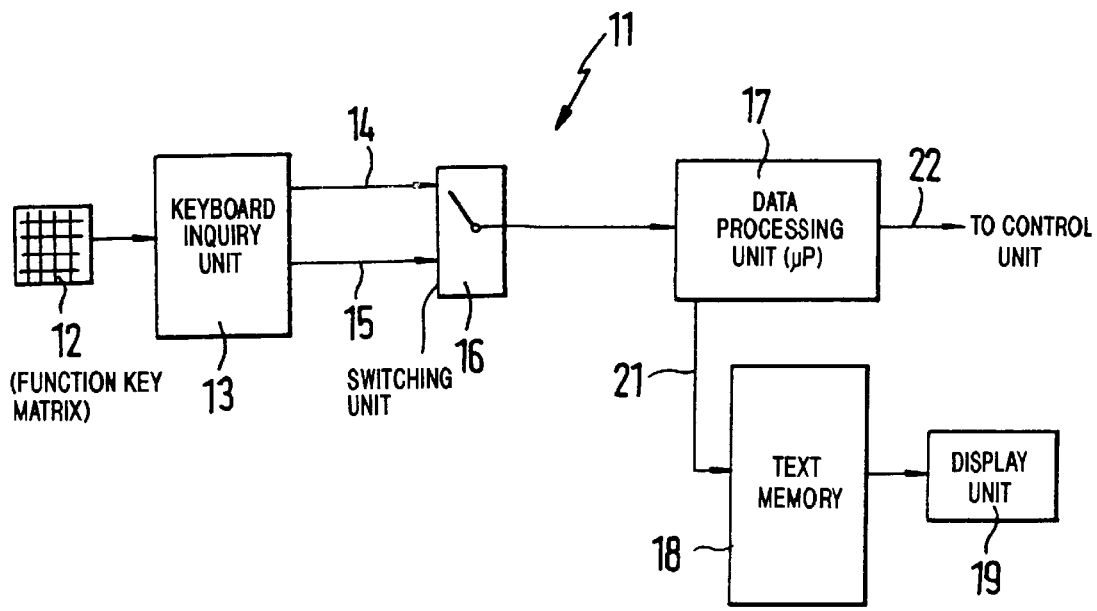
FIG. 1 is a block circuit diagram for a circuit arrangement for implementing a method to facilitate the operation of terminals according to one embodiment of the present invention.

According to FIG. 1, a terminal 11, for example in the form of a telephone, for a telecommunications system operated in the ISDN (Integrated System Digital Network) system includes, in addition to non-illustrated number keys, a plurality of function keys illustrated as a matrix 12 with fixed or variable association which are connected with a keyboard inquiry unit 13. Keyboard inquiry unit 13 is provided with two outputs 14 and 15 which are connected by way of a switching unit 16 with a data processing unit, for example in the form of a microprocessor 17. Microprocessor 17 actuates, by way of a first output 21, a text memory 18 which is connected with a display unit 19 that is suitable for the optical display of alphanumeric characters or is equipped for audible voice announcements. Each function key of function key field 12 is associated with a certain, preferably detailed text to indicate the function that can be executed with it. The text is stored in text memory 18 and is displayed in a suitable manner on display unit 19. By way of a second output 22, microprocessor 17 is connected with a non-illustrated control unit for the initiation of control processes.

The terminal is able to either actuate the performance feature function associated with each function key of function key field 12 or to initially display a textual or acoustic explanation thereof before the function is executed. This selection of the two possibilities for either displaying the function of the respective function key and then executing it, if required, or executing it immediately is predetermined by the manner and/or extent, that is, the duration of the actuation, of the respective function key in function key field 12.

A first operation or actuating mode for the function keys and their evaluation by keyboard inquiry unit 13 resides in that the first actuation of one of the function keys causes the associated function to be displayed on display unit 19 and a further actuation of the same function key causes the respective function or performance feature to be executed. This variation of the method is effected by way of the output 14 of keyboard inquiry unit 13 if this variation has been selected by way of switching unit 16.

Another variation or operational mode of the method that can be selected by means of switching unit 16 is to predetermine the extent, for example the duration of actuation, of one of the function keys of the function key field. In this case, a short actuation of the respective function key executes the respective function or performance feature at once. If the operator wishes only to obtain information about the function to be executed by a certain function key, the respective function key must be actuated for a longer period of time, thus causing microprocessor 17 to display the text associated in the text memory with this function key on display unit 19.

In other words, in the mentioned first variation, the inexperienced user is able to reassure himself before each execution of a function which one of the functions or performance features it actuates and performs. In the second variation mentioned above, it is left to the user whether the function or performance feature is to be executed immediately or whether the display on display unit 19 would enable him to clear up in his mind what the function to be executed is intended to accomplish.

According to an embodiment of the present invention that is not illustrated in the drawing, these two variations in the manner and extent of actuation of the function keys may each be realized in separate terminals. According to the embodiment shown in FIG. 1, however, terminal 11 is equipped with both variations which can be separately and distinctly recognized and evaluated by means of keyboard inquiry unit 13 and can be manually selected by the operator and set in terminal 11 by way of switching unit 16.

As a further feature of the embodiment of FIG. 1 it is possible to connect, in a manner not shown, a third output of keyboard inquiry unit 13 by way of switching unit 16 with processor 17. If this way is selected with the aid of switching unit 16, each actuation of a function key from function key field 12 is understood by processor unit 17 as the actuation of the respective function or the respective performance feature insofar as this is possible at the present moment in the operation and is forwarded to the control unit by way of a second output 22. If, however, microprocessor unit 17 detects that there is an error in the operation, for example due to the fact that this function is not possible in the present operating state or because the execution of this function is interrupted again by the operator, microprocessor unit 17 causes the text corresponding to this function key or the subsequently actuated function key to be displayed first on display unit 19.

Figure 2:
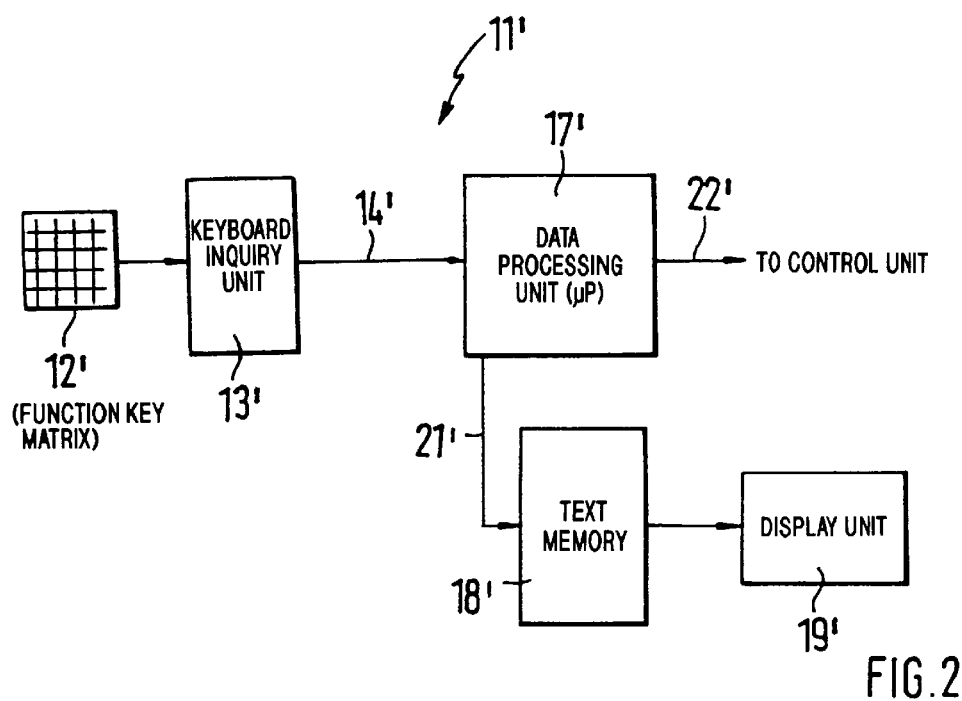
FIG. 2 is a block circuit diagram for a circuit arrangement for implementing a method to facilitate the operation of terminals according to another embodiment of the present invention.

In the embodiment shown in FIG. 2, terminal 11' is also equipped, in addition to the non-illustrated number keys, with a function key field 12', a keyboard inquiry unit 13', a data processing unit in the form of a microprocessor 17' whose one output 22' leads to a control unit and whose other output 21' leads to a text memory 18' and from there to a display unit 19'.

As in the embodiment of FIG. 1, keyboard inquiry unit 13' is able to differentiate between the above-mentioned two or three variations with respect to manner and extent of the actuation of the individual function keys of function key field 12'. Moreover, keyboard inquiry unit 13' converts the respective type and the respective extent of the actuation into a key code and feeds the coded output signals to microprocessor 17'. Microprocessor unit 17' makes a decision about whether to forward the control signals to control unit 21' or to text memory 18'.

In this embodiment it is possible to automatically set the individual variations or stages in the manner and extent of the actuation of the function keys, namely as a function of the frequency of use of the display on display unit 19' and the frequency of operator errors. For example, microprocessor unit 17' begins with the above-mentioned first stage for inexperienced users and then automatically switches to the second stage for experienced users if in a plurality of cases or in most cases, the execution of the function itself is initiated immediately after the display of the function on display unit 19'. Microprocessor 17' here decides according to a predetermined program from the fact that the user calls up the function explanations very frequently or almost never whether to switch to the above-mentioned third stage or back again to the first stage. It is understood that extensive variations are possible with respect to the automatic setting of the individual stages.

In the case where a decision is made about the actuation of the display of a function or the actuation of the execution of a function by the duration of the actuation of one of the function keys, an adjustable minimum time is provided for the actuation of the function key that initiates a display.

If the appropriate actuation of one of the function keys, in whatever set stage, causes the function to be displayed on display unit 19 or 19', this display cannot only be cleared by the corresponding actuation of the same function key but also by actuation of a different function key.

It is understood that the display of the respective function is possible in any desired operating state of the terminal, that is, for example, in the rest state as well as in the connected state. According to a further non-illustrated embodiment of the present invention, terminal 11 or 11' is returned to its initial state with the actuation of a reset key.

Another preferred embodiment according to claim 11 will now be described in connection with FIG. 3.

Figure 3:
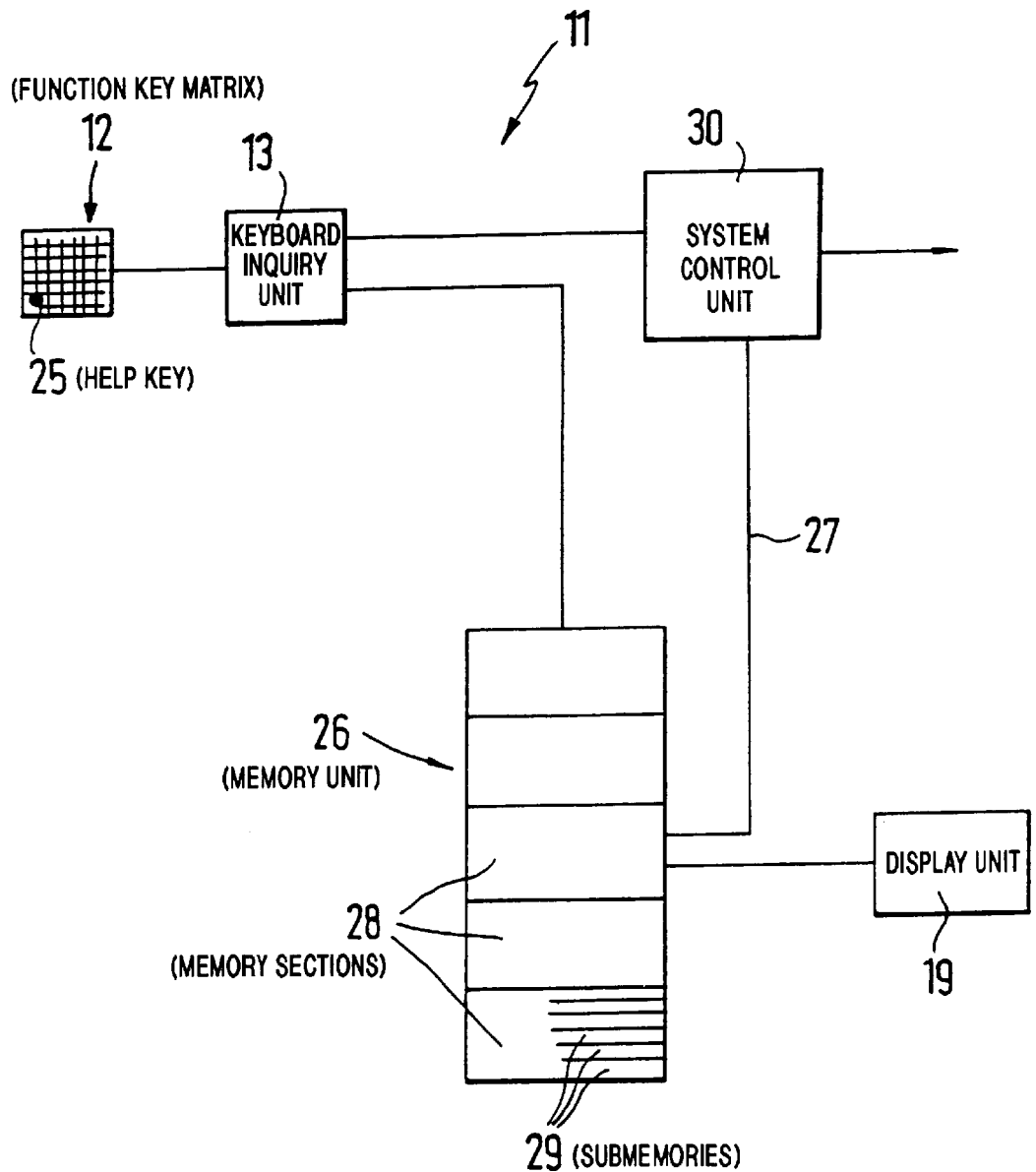
FIG. 3 is a block circuit diagram for a circuit arrangement for implementing a method to facilitate the operation of terminals according to a further embodiment of the present invention.

According to FIG. 3, terminal 11 is provided with a plurality of function keys that are arranged in a matrix 12, are connected with keyboard inquiry unit 13, and are provided with fixed or variable assignments. In addition, function key field 12 also includes a help key 25, which serves as a help input device for signalling that help is desired. One output of keyboard inquiry unit 13 is connected with a memory unit 26 and its other output with a system control unit 30. By way of a line 27, memory unit 26 and system control unit 30 are connected with one another.

By way of a further output, memory unit 26, which includes a microprocessor, actuates display unit 19 which is suitable for the optical display of alphanumeric characters or is equipped to make audible voice announcements. Memory unit 26 is composed of a plurality of memory sections 28 of which at least one is provided with submemories 29 in which the performance features assigned to the terminal are stored in such a manner that each one of the performance features can be displayed on or by display unit 19 as well as forwarded for execution to system control unit 30.

Terminal 11 is able to indicate and optically or acoustically explain to the user in every current operating state—that is, for example, in the rest state before a connection is established or also in the connected state—which performance features or ISDN service features are possible and can be executed during the respective operating state.

For this purpose, actuation of help key 25 actuates memory unit 26 in such a way that, corresponding to the operating state obtained from system control unit 30, all those performance features that terminal 11 is able to execute in this operating state are read out from memory unit 26 and fed to display unit 19. Depending on the number of performance features that can be executed, or depending on the configuration of the particular embodiment, the performance features possible in the respective operating state are displayed on the display unit either in groups or individually.

If the respectively possible performance features are displayed on the display unit, possibly in successive groups, it is advisable to assign a certain function key to each one of these performance features. If then one of these performance features is selected to be executed, the function key assigned to this performance feature is depressed so that control unit 30 is actuated accordingly. After a certain performance feature has been executed, the display unit is cleared again, for example.

If the performance features that are possible in the respective operating state are displayed individually on the display unit, it is advisable to assign to one of the existing function keys in function key field 12 the "page down" function or assign the function "execute" to another function key. In other words, in order to explain or display all possible performance features, each one of these performance features can be successively read out of memory unit 26 with the aid of the "page down" function key. If one of the performance features is to be executed, the function key "execute" is actuated. It is understood that it is also possible to perform the page down function or a successive readout of the performance features from memory unit 26 automatically in a certain clocked manner which involves time periods of sufficient length to make it possible, if necessary, to also actuate the "execute" function key.

With the group-wise display of the possible performance features it is also possible, according to one embodiment, to display the performance features of each displayed group individually, accompanied by, for example, a more detailed text. This can be accomplished either by renewed actuation of the help key or automatically in a clocked manner.

If, for example, an ISDN telephone terminal is involved in a call, that is, its voice channel is switched through in both directions, the following performance features, for example, that can be executed in this operating state are displayed for the user:

(a) "park", in order to plug terminal 11 into another receptacle and continue the conversation there;

(b) "transfer", to another terminal of a different service or of the same service;

(c) "recall", in order to establish another telephone connection, with the first connection remaining in effect.

The user is now able to look at the explanations for these performance features, can select one and have a certain performance feature executed.

The same applies of course also for the rest state in preparation for a selection in ongoing connections, for future connections and the like, for the operating state during the execution of certain performance features, etc.

The clearing of display unit 19 takes place either automatically at the end of a certain time or in that a reset key is provided whose actuation clears the display unit.

It will be understood that the above description of the present invention is susceptible to various modifications, changes and adaptations, and the same are intended to be comprehended within the meaning and range of equivalents of the appended claims.

What is claimed is:

1. A method of facilitating the operation of a terminal equipped with an input keyboard whose function keys are given fixed and/or variable function assignments, the terminal further including a display unit on which help text explaining the function of the function keys is displayable, comprising:

1) enabling the terminal to selectively perform:
      a) execution of the respective function, or
      b) displaying help text explaining the respective function, wherein performance of either the execution or the displaying by the terminal is initiated by actuation of the respective function key;
   2) determining whether to effect said execution or said displaying with the terminal by at least one of:

a) detecting the way in which actuation of the respective function key is performed by an operator, and/or b) detecting the extent of the actuation of the respective function key by the operator; and wherein, prior to step 2), variations in the detection of the way and/or the extent of actuation of the respective function key are selected by manually presetting at least one of the variations by the operator according to the operator's knowledge of the terminal.

2. A method according to claim 1, wherein the displaying of help text explaining a function is performed by the terminal when it is determined by detecting in step 2b that the respective function key is actuated a first time for a relatively long period of time, and wherein execution of the function is performed by the terminal when it is determined by detecting in step 2b that the same function key is actuated a second time for a relatively short period of time.

3. A method according to claim 1, wherein the displaying of help text explaining a function is performed by the terminal when it is determined by detecting in step 2b that the respective function key is depressed for either the same length or longer than an adjustable minimum time.

4. A method according to claim 1, wherein determining step 2 further comprises:

c) detecting and counting operation errors for the respective function key and/or all function keys, and comparing with an operation error quota;

wherein the initiation of the displaying of help text explaining a function is initiated when the operation errors counted exceeds the adjustable operation error quota.

5. A method according to claim 1, further comprising:

3) cancelling a display of help text explaining a function of a first one of the function keys when it is determined by detecting in steps 2a or 2b that a second one of the function keys is actuated.

6. A method according to claim 1, wherein when actuation of a reset key is determined by detecting in steps 2a or 2b, the terminal is reset to an initial state.

7. A method of facilitating the operation of a terminal equipped with function keys and a display unit, comprising:

1) when one of the function keys is actuated, enabling the terminal to selectively perform:

a) execution of a function assigned to the actuated function key, or b) displaying help text, on the display unit, explaining the function of the actuated function key;

2) determining whether to effect said execution or said displaying with the terminal by at least one of:

a) detecting the way in which actuation of the actuated function key was performed by an operator, and b) detecting the extent of the actuation of the actuated function key by the operator; and wherein, prior to step 2), one of a plurality of variations in the detection of at least one of the way and the extent of actuation of the actuated function key is selected either manually by the operator according to the operator's knowledge of the terminal, or automatically by the terminal.

8. A method according to claim 7, wherein the displaying of help text explaining a function is performed by the terminal when it is determined by detecting in step 2b that the actuated function key was actuated a first time for a relatively long period of time, and wherein execution of the function is performed by the terminal when it is determined by detecting in step 2b that the same function key was actuated a second time for a relatively short period of time.

9. A method according to claim 7, wherein the displaying of help text explaining a function is performed by the terminal when it is determined by detecting in step 2b that the actuated function key was depressed for longer than a predetermined minimum time.

10. A method according to claim 7, wherein step 2 further comprises:

c) detecting and counting operation errors for at least one of the function keys, and comparing the count with an operation error quota;

wherein the initiation of the displaying of help text explaining a function is initiated when the operation errors counted exceeds the operation error quota.

11. A method according to claim 7, further comprising:

3) cancelling a display of help text explaining the function of the actuated function key if another of the function keys is subsequently actuated.

12. A method to claim 6, wherein when actuation of a reset key is determined by detecting in steps 2a or 2b, the terminal is reset to an initial state.

13. A method for facilitating the operation of a terminal equipped with function keys and a display unit, comprising:

selecting one out of a plurality of operational modes for the terminal;

manually actuating one the function keys in a first manner associated with the selected mode or in a second manner associated with the selected mode, the first and second manners differing from one another in at least one of the way and the extent that the function key is activated; and detecting whether the actuated function key was actuated in the first or second manner associated with the selected mode;

executing a function assigned to the actuated function key if it was actuated in the first manner; and displaying help text on the display unit about the function assigned to the actuated function key if it was actuated in the second manner.

14. A method according to claim 13, wherein, for one of the operational modes, the second manner of actuation is a first depression of the function key and the first manner of actuation is a second depression of the function key.

15. A method according to claim 14, wherein, for another of the operational modes, the first manner of actuation is depression of the function key for a first time period and the second manner of actuation is depression of the function key for a second time period that is longer than the first time period.

16. A method according to claim 15, further comprising determining an operator error rate, and wherein, for a further one of the operational modes, the first manner of actuation is depression of the function key by an operator whose operator error rate is below a predetermined level and the second manner of actuation is depression of the function key by an operator whose operator error rate is above the predetermined level.

17. A method according to claim 13, wherein, for another of the operational modes, the first manner of actuation is depression of the function key for a first time period and the second manner of actuation is depression of the function key for a second time period that is longer than the first time period.

18. A method according to claim 13, further comprising determining an operator error rate, and wherein, for a further one of the operational modes, the first manner of actuation is depression of the function key by an operator whose operator error rate is below a predetermined level and the second manner of actuation is depression of the function key by an operator whose operator error rate is above the predetermined level.

19. A method according to claim 13, wherein the selecting step is conducted manually by an operator.

20. A method according to claim 13, wherein the selecting step is conducted automatically by the terminal.

* * * * *